Figure 1:
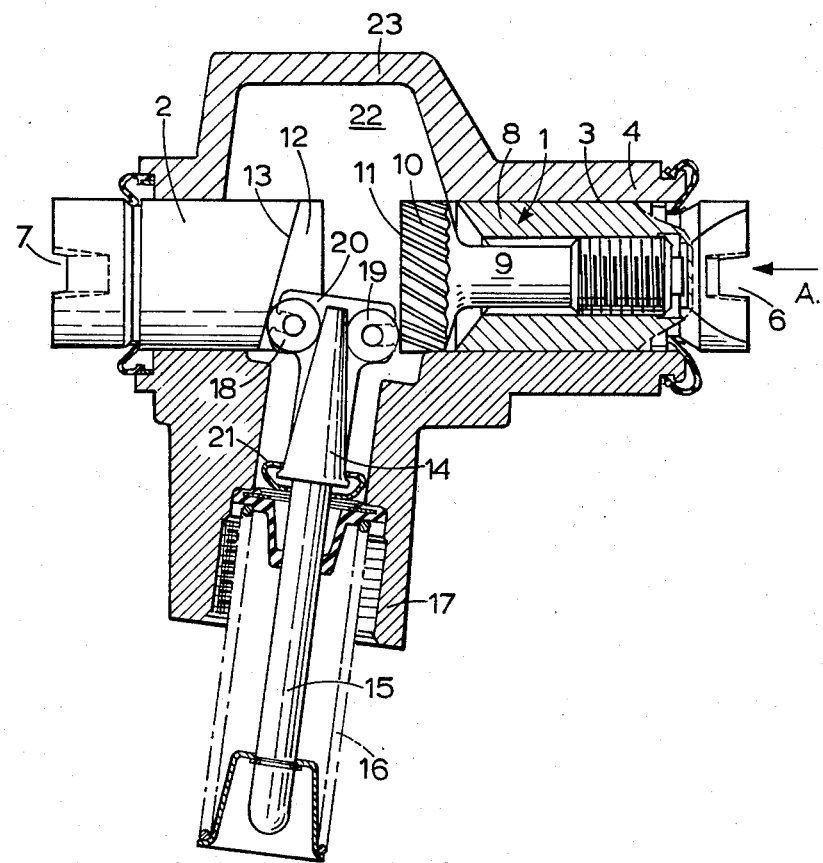

United States Patent [19]

Farr

[11] 3,994,371

[45] Nov. 30, 1976

[54] VEHICLE BRAKE ACTUATORS
[75] Inventor: Glyn Phillip Reginald Farr, Kenilworth, England
[73] Assignee: Girling Limited, Birmingham, England
[22] Filed: June 13, 1975
[21] Appl. No.: 586,605

[30] Foreign Application Priority Data
June 13, 1974 United Kingdom............ 26212/74

[52] U.S. Cl. ................................ 188/343; 74/110; 188/79.5 SC
[51] Int. Cl.² ...................................... F16D 65/22
[58] Field of Search ............... 188/79.5 S, 79.5 SC, 188/217, 343, 367–369; 74/110

[56] References Cited
UNITED STATES PATENTS
3,037,584  6/1962  Cox et al. ..................... 188/343
FOREIGN PATENTS OR APPLICATIONS
796,868  2/1936  France ............................. 74/110

Primary Examiner—Duane A. Reger
Attorney, Agent, or Firm—Scrivener, Parker, Scrivener and Clarke

[57] ABSTRACT

In a wedge actuator the inner end face of one tappet which co-operates with the wedge member is made normal to the axis of movement of that tappet, and the line of action of the wedge member is inclined to the plane of that end face.

8 Claims, 2 Drawing Figures

VEHICLE BRAKE ACTUATORS

This invention relates to vehicle brake actuators of the kind commonly known as wedge actuators.

In such actuators first and second tappets slidably guided in a housing are arranged to be urged apart to apply the brake by the forcing of a wedge member between their inner end faces.

In such actuators the inner end faces of the tappets are usually oppositely inclined to their directions of movement, and the line of action of the wedge member bisects the angle between the inclined faces of the tappets.

Often the end faces of the tappets are inclined at different angles to the directions of movement of the tappets, for example 75° and 85° respectively. In an internal shoe drum brake the line of action of the wedge member is often arranged to be inclined to the axis of the brake in a diametral plane of the brake so that an actuating member for the wedge does not foul the vehicle axle assembly. The outer and inner end faces of each tappet are then at a compound angle to each other, and this angle differs for the two tappets of each actuator and moreover for right and left hand brakes. It is then necessary to manufacture tappets of four kinds.

Complications also arise with present actuators when one of the tappets is adjustable by means requiring rotation of the tappet. Hitherto that has necessitated making the adjustable tappet in several parts of which the inner engaged by the wedge does not rotate, and this involves difficulty in assembly.

According to our invention in a vehicle brake actuator of the kind set forth the inner end face of the first tappet is normal to the axis of movement of that tappet, and the line of action of the wedge member is inclined to the plane of that face.

The first tappets of actuators for right and left hand brakes can be made identical and thus the range of tappets required is reduced. This reduces the chances of mis-assembly through the use of an incorrect tappet.

When the first tappet incorporates an adjuster the inner end portion of the tappet provided with said inner end face can be made rotatable without affecting its cooperation with the wedge member. The first tappet may then comprise a minimum number of parts which can be assembled into position without the need for a covered access hole in the housing.

Preferably, therefore, the wedge member is carried by an actuating member which is accessible to one side of the housing, and the other side of the housing is a permanently closed integral portion of the housing.

Although the directions of movement of the two tappets will usually be co-axial there may be an angle between them.

The line of action of the wedge member may be inclined at such an angle that equal movements are imparted to the tappets, or one may be moved through a greater distance than the other, this depending on the design or type of the brake.

Figure 2:
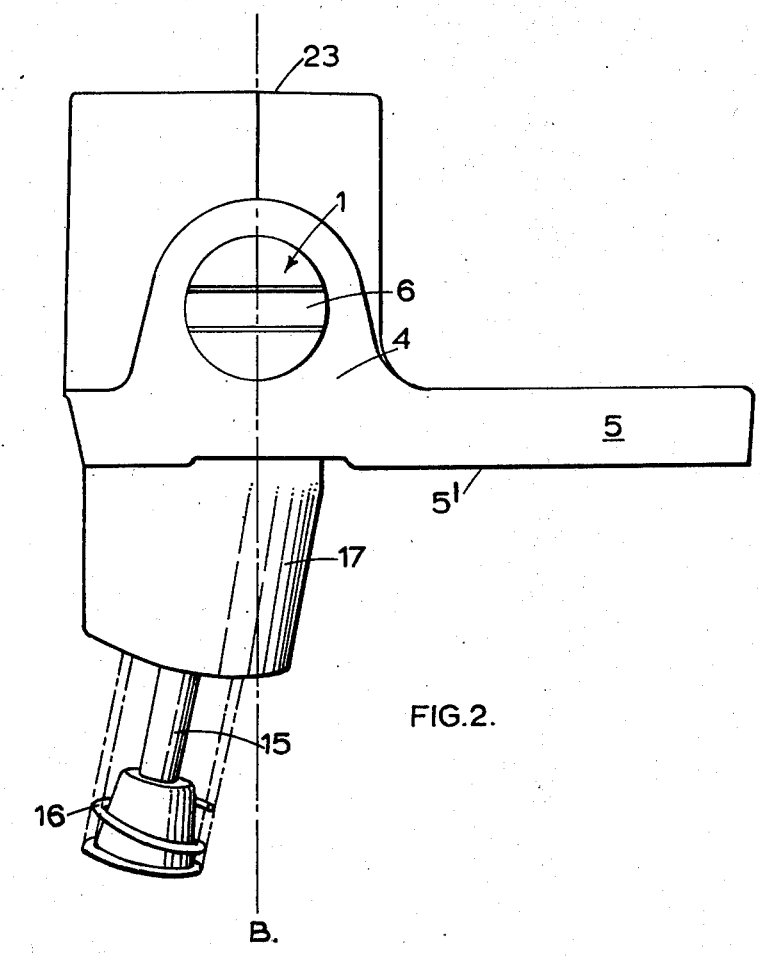

A wedge actuator in accordance with the invention will now be described, by way of example only, with reference to the accompanying drawings in which:

FIG. 1 is a section of the actuator in a plane containing the axes of the tappets and wedge, the wedge being shown in its outermost position; and FIG. 2 is an elevation of the actuator looking in the direction of the arrow A along the axis of the first tappet.

In this actuator generally cylindrical tappets 1 and 2 are in axial alignment and are axially slidable in a through-bore 3 in a housing 4 adapted to be secured by a flange 5 to the backplate of an internal shoe-drum brake with the plane face 5' in engagement with the backplate.

Opposite outer ends of the tappets 1 and 2 are formed with respective slots 6, 7 for engagement with the webs of adjacent ends of brake shoes (not shown).

The first tappet 1 is formed in two parts 8 and 9 which have a threaded engagement with each other whereby the axial length of the first tappet may be adjusted by rotation of the part 9 relative to the part 8 which is fixed against rotation in use by the engagement of its slot 6 with one of the brake shoes. The inner end portion 10 of the part 9 has an inner end face 11 which is normal to the axis of the tappets and is formed with peripheral gear teeth for engagement by a meshing gear (not shown) for effecting rotation of the part 9 to adjust the length of the first tappet.

The second tappet 2 is provided at its inner end with a transverse slot 12 the base 13 of which constitutes an inner end face of that tappet inclined to the axis of the tappet.

A wedge member 14 is carried by an integral actuating rod 15 biassed outwardly by a spring 16. The rod 15 and wedge member 14 extend through an extension 17 to the housing. A pair of rollers 18 and 19 are interposed between adjacent faces of the wedge member and the inner end faces 11 and 13 respectively of the tappets, with the roller 18 working in the groove 12. The rollers are retained in a cage 20 of which an enlarged head 21 is a loose fit on the actuatong rod 15. The enlarged head 21 is a feature of our co-pending U.K. Pat. application No. 23223/74 and prevents the cage and rollers from passing into the space 22, during storage and transit of the actuator, by engagement of the head 21 with the inner end of tappet 2, the outward movement of the tappet 2 being limited by a suitable stop (not shown).

The line of action of the wedge member 14 as shown in FIG. 1 is inclined to the axis of the tappets and bisects the angle between the inner end faces 11 and 13 of the tappets so that inward movement of the wedge member urges the tappets outwardly in opposite directions by equal amounts. In FIG. 2 it can be seen that the line of action of the wedge member 14 is also inclined to a plane B which extends through the axis of the first tappet 1 and is normal to the face 5' of flange 5. When the actuator is mounted on a brake back-plate the face 5' will lie in a plane normal to the brake axis so that the plane B is parallel to the brake axis.

The line of action of the wedge member has been inclined relative to plane B in order to clear a vehicle axle assembly, or steering assembly on a front brake.

For some vehicles the inclination of the line of action of the wedge relative to the tappet axes may be sufficient to clear the axle assembly and it may not be necessary also to incline the line of action of the wedge relative to the plane B.

A portion 23 of the housing opposite to the extension 17 is of an integral part of the housing as distinct from the usual removable cover plate. The tappets and cage can each be assembled into the housing by being introduced through the other ends of the bore 3 without the need for a central access hole in the housing.

Having the inner end face of the first tappet normal to its axis enables that face to be machined on a lathe as the tappet is cut to length. With angled faces the tappet has to be transferred to a milling machine or broach for the ramp to be formed as a separate operation after a stock piece has been cut to length, and for this the stock piece has to be initially longer. A plane face therefore reduces material and machining costs.

I claim:

1. A vehicle brake actuator of the kind comprising a housing, first and second tappets linearly slidable in the housing for engagement with adjacent ends of a pair of brake shoes, and a wedge member linearly movable in said housing, said first and second tappets having inner end faces arranged one on each side of said wedge member whereby said tappets are urged apart by the forcing of said wedge member between said inner end faces, wherein said first tappet has its inner end face in a plane normal to the axis of movement of said first tappet, and said wedge member is arranged in the housing with its line of action inclined to the said plane.

2. A vehicle brake actuator as in claim 1 wherein said first and second tappets are arranged with their axis of movement in line, and said second tappet has its inner end face in a plane inclined at an angle to the said line of action of said wedge member.

3. A vehicle brake actuator as in claim 1 wherein said first tappet incorporates an inner end portion upon which said inner end face is formed, said inner end portion being rotatable in said housing about said axis of movement of said first tappet.

4. A vehicle brake actuator as in claim 3 wherein adjustment means are incorporated in said first tappet for adjusting the length of said first tappet, said adjustment means being responsive to rotation of said inner end portion.

5. A vehicle brake actuator as in claim 4 wherein said adjustment means comprises a threaded engagement between said inner end portion and the remainder of said first tappet.

6. A vehicle brake actuator as in claim 1 wherein an actuating member secured to the wedge member is accessible to one side of said housing, and the opposite side of said housing comprises a permanently closed integral portion of said housing.

7. A vehicle brake actuator as in claim 1 wherein said first tappet is of substantially cylindrical shape and is formed with said inner end face by turning.

8. An internal shoe drum brake comprising a rotatable drum, a stationary back-plate, a pair of brake shoes mounted on the back-plate for engagement with said brake drum, said back-plate lying in a plane normal to the axis of rotation of said drum, and a brake actuator comprising a housing mounted on the back-plate, first and second tappets linearly slidable in said housing and having outer ends engaging respectively with adjacent ends of said brake shoes, and a wedge member linearly movable in said housing, said first and second tappets having inner end faces arranged one on each side of said wedge member whereby said tappets are urged apart by the forcing of said wedge member between said inner end faces, wherein said first tappet has its inner end face in a plane normal to the axis of movement of said first tappet, and said wedge member is arranged in said housing with its line of action inclined to said plane of said inner end face and inclined to a plane which contains the axis of movement of said first tappet and which is parallel to said drum axis.

* * * * *